United States Patent [19]

Turnbull et al.

[11] Patent Number: 4,952,808
[45] Date of Patent: Aug. 28, 1990

[54] THERMAL RADIATION DETECTION APPARATUS

[75] Inventors: Andrew A. Turnbull; Andrew I. Cox, both of Reigate, England

[73] Assignee: U.S. Philips Corp., New York, N.Y.

[21] Appl. No.: 362,189

[22] Filed: Jun. 6, 1989

[30] Foreign Application Priority Data

Jun. 7, 1988 [GB] United Kingdom ............... 8813424

[51] Int. Cl.[5] .......................... H01L 27/13; G01J 5/22
[52] U.S. Cl. ................................. 250/338.3; 250/332
[58] Field of Search ................... 250/338.3, 330, 332, 250/349

[56] References Cited

U.S. PATENT DOCUMENTS

| | | | |
|---|---|---|---|
| 4,072,563 | 2/1978 | Koundy | 250/332 |
| 4,795,904 | 1/1989 | Richa | 250/332 |
| 4,804,844 | 2/1989 | Lee | 250/338.3 |
| 4,868,389 | 9/1989 | Moore | 250/332 |

FOREIGN PATENT DOCUMENTS 2186146  8/1987  United Kingdom .

OTHER PUBLICATIONS

SPIE, vol. 807, Passive Infrared Systems and Technology (1987), pp. 98–105, "The Design of Low-Noise Arrays of MOSFETS for Pyroelectric Array Readout", Watton et al.
SPIE, vol. 807, Passive Infrared Systems and Technology (1987), pp. 92–98, "High Resolution 64–Moment Pyroelectric Linear Array IR Detector", Turnbull et al.

Primary Examiner—Constantine Hannaher
Assistant Examiner—Edward J. Glick
Attorney, Agent, or Firm—William L. Botjer

[57] ABSTRACT

A thermal radiation detection apparatus has an array of pyroelectric detector devices (10) for receiving radiation from a scene whose outputs, e.g. from associated source followers (12) are supplied via a multiplexer (14) in turn to a processing circuit (20) which is responsive to each detector device signal to produce an output which substantially faithfully reproduces the received radiation signal without requiring that a chopper be used. The processing circuit operates with a correction factor to produce an output signal with first and second components proportional respectively to the device signal and its rate of change, the relative proportions of the components being in a ratio according to the device's thermal time constant. Initial device voltage level and the device's electrical time constant effects can be corrected by additional processing in the circuit (20), producing a third component of the output proportional to the integral of the device's output and in a ratio to the first component according to the electrical time constant.

11 Claims, 4 Drawing Sheets

$$(1) \quad T = \frac{1}{G}\left[R - (R - GT_0)e^{-\frac{G}{H} \cdot t}\right]$$

$$(2) \quad i = pA \frac{dT}{dt}$$

$$(3) \quad i = pA \left(\frac{R - GT_0}{H}\right) e^{-t/T_c}$$

$$(4) \quad V = \frac{pA(R - GT_0)}{HC_e} \cdot \frac{(e^{-t/T_c} - e^{-t/T_e})}{(1/T_e - 1/T_c)} + V_o e^{-t/T_e}$$

$$(5) \quad V = \frac{pART_c}{HC_e}(1 - e^{-t/T_c})$$

$$(6) \quad y = \frac{pAR}{HC_e} e^{-t/T_c}$$

$$(7) \quad \Delta V = y t_s ; \quad \Delta V_{t=0} = \frac{pAR}{HC_e} \cdot t_s$$

$$(8) \quad V_2 - V_1 = \frac{pAR}{2HC_e} \cdot t_c$$

$$(9) \quad \Delta V = \Delta V_o e^{-t/T_c} ; \quad \Delta V_o = \frac{pAR}{HC_e} \cdot t_s$$

$$(10) \quad 1/T_c = \Delta V_o (1 - e^{-t/T_c})$$

$$(11) \quad V_1 = (DR_1 - DGT_0)(e^{-t/T_e} - e^{-t/T_c}) + V_o e^{-t/T_e}$$

$$(12) \quad V_1' = V_1 + T_e \dot{V}_1 = (DR_1 - DGT_0)e^{-t/T_c} \cdot \left(\frac{T_e}{T_c} - 1\right)$$

$$(13) \quad V_1'' = (DR_1 - DGT_0)\left(\frac{T_e}{T_c} - 1\right)$$

$$(14) \quad V_2 = \left(DR_2 - DG\left\{\frac{1}{G}\left[R_1 - (R_1 - GT_0)\right]e^{-t_1/T_c}\right\}\right)\left(e^{-(t-t_1)/T_e} - e^{-(t-t_1)/T_c}\right) + \left\{(DR_1 - DGT_0)(e^{-t_1/T_e} - e^{-t_1/T_c}) + V_o e^{-t_1/T_e}\right\} e^{-(t-t_1)/T_e}$$

$$(15) \quad \left(\frac{1}{T_c}\right)_{total} = \left(\frac{1}{T_c}\right)_{0 \to t_1} + \left(\frac{1}{T_c}\right)_{t_1 \to t}$$

$$(16) \quad V_2'' = (DR_2 - DGT_0)\left(\frac{T_e}{T_c} - 1\right)$$

THERMAL RADIATION DETECTION APPARATUS

DESCRIPTION

BACKGROUND OF THE INVENTION

The invention relates to thermal radiation detection apparatus comprising at least one pyroelectric detector device for receiving radiation from a scene and generating a voltage signal at its output which varies in accordance therewith, the detector device output being coupled to an output of the apparatus via a signal processing circuit for processing the voltage signal generated by the detector device.

Thermal detectors using pyroelectric devices are generally well known. They are used for a variety of different purposes such as, for example, thermal imaging, infra-red line scanning, and intruder detecting. Although a single pyroelectric device comprising a single active element may be used in a simple system for example for detecting intruders, arrays of elements, arranged linearly or two dimensionally, are now commonly used in more sophisticated systems such as imaging. A pyroelectric element generally consists of a layer of pyroelectric material sandwiched between two electrodes. When the temperature of the pyroelectric material changes, for example as a result of the incidence on the element of infra-red radiation from a scene being viewed, electrical charges are generated at the electrodes. If the element is arranged as a capacitor in a suitable amplifying circuit the resultant current or the voltage developed across a resistor can be detected. Since the pyroelectric charge is generated only when the temperature of the element is changing it is necessary for the temperature to be varied continuously to obtain a continuous electrical signal. In a simpler system, the required change in temperature may be caused by movement within the scene being viewed, for example an intruder moving across a surveillance region, so that a detector output signifying the presence of a moving object is produced which can then be used to trigger an alarm. Alternatively, when an image of the scene is required it is possible to scan the scene being viewed over the detector using either a suitable optical system or by moving the detector so that relative motion between the detector and the scene is obtained.

Although these methods provide time modulation of the incoming radiation enabling the pyroelectric element or elements to respond, it has been considered preferable to employ an optical chopper in front of the detector. The optical chopper, which may be in the form of a rotating apertured disc, periodically interrupts the incident radiation, the pyroelectric element being exposed to a substantially constant reference temperature while the radiation from the scene being viewed is cut off. The frequency of interruption may be in the range of a few Hertz to several hundred Hertz.

Exposure of the pyroelectric element to a scene results in the temperature of the element, and the voltage generated, gradually increasing at a rate determined by the thermal time constant of the element, the thermal time constant being given by the ratio of the thermal capacitance to conductance. Constant exposure of the pyroelectric element to a static scene over a prolonged period will produce a transient signal which decays due to charge leakage effects in the detector device. Heat loss from the element is radiative and is also affected by the heat sink effect of a substrate on which the element is mounted. When thermal equilibrium is reached, no signal is produced. Thus when a chopper is used, signal output is dependent on the chopping frequency, which in turn is chosen having regard to the thermal and electrical time constants of the detector device. Assuming the detector has a comparatively long thermal time constant, chopping of the incoming radiation results in the temperature curve of the pyroelectric element having an a.c. component superimposed on a gradually increasing d.c. component which reaches a plateau when thermal equilibrium is attained. The a.c. component produces a generally corresponding a.c. output voltage which is substantially proportional to the incoming radiation. Heretofore, use has been made in thermal detectors using choppers of a signal differencing processing technique in order to enhance the quality of the output signals. Differencing processing has been used with pyroelectric imaging sytems, for example with pyroelectric vidicons, for many years now and provides beneficial processing functions. An example of this kind of processing, applied to an imaging sytem, is described in U.S. Pat. No. 4,072,863 to which reference is invited. Briefly, the output signals from each of a number of pyroelectric elements in any array are gated in turn by a respective FET under the control of a shift register to a memory or delay line and also to one input of a differentiating amplifier. The memory output is connected to the other input of this amplifier. Signals produced by each respective element in successive frame periods corresponding to the periods in which the element is alternatively exposed to a scene and shielded by the chopper are thus supplied to the differentiating amplifier and the memory. The memory delays the passage of these signals to the amplifier by one frame period so that the amplifier produces a signal representative of the differences between a pair of successive signals from the element produced by the chopper open and closed states respectively. Because during the chopper closed states the element is allowed to cool, for example by radiation, the element signals will be of opposite polarity to those produced during the chopper open states. Hence the amplifier effectively adds the signals produced in successive chopper frames. Fixed pattern noise, which is substantially constant for open and closed frames, is therefore cancelled out by the differential amplifier. The output from the differential amplifier is fed via a switch synchronized with the chopper alternately to the inverting and non-inverting inputs of an inverting amplifier to produce a sequence or train of signals of the same polarity. Each of these signals is then fed to a summing circuit where it is added to the signal stored in a memory. The summed signal is then fed back into the memory. Each time a signal in the sequence is applied to the summing circuit it is added to the stored signal in the memory. In this way the signals produced by each pyroelectric element are integrated over a predetermined period of time. The output from the memory is fed to a utilisation device such as a display.

A processing technique having similarities is described in the article entitled "The Design of Low-Noise Arrays of MOSFETs for Pyroelectric Array Readout" by Watton and Manning published in SPIE Vol. 807, Passive Infrared Systems and Technology, pages 98 to 105, 1987 to which reference is also invited. Again, a differencing processing technique is described in which output signals from an individual element in an array from two consecutive field periods during which the chopper is open and closed respectively, and separated accordingly by a field time assumed to be less than the thermal time constant, are subtracted using a field delay. The output from this processor is stripped of the offset voltages which vary from element to element and are responsible for fixed pattern noise. This processing technique acts, therefore, as a filter for low frequency noise. In a detector in which comparatively long thermal time constants are present a modified image difference processing technique involving three consecutive field signals and requiring a frame (equal to two fields) store may be used.

Reliance is placed on the use of a chopper in these known apparatus for satisfactory operation. Although it is feasible for a detection apparatus to be operated without a chopper, in this case it is possible to obtain an output signal which varies with changes in received radiation using simple image differencing techniques. However, the output from the apparatus will not represent the changes in the received radiation faithfully. This is due to the effects of the finite thermal and electrical time constants involved. Without a chopper the shape of the output signal would contain faults, or anomolies.

Whilst a chopper has therefore, been considered important to satisfactory performance of a pyroelectric detector, its use is not without attendant disadvantages. The chopper, usually an electromechanical component, adds to the bulk and weight of the equipment and requires a suitable power supply. Moreover, when used with a thermal detector consisting of an array of pyroelectric elements there is a need to synchronise the action of the chopper with electronic scanning of the elements of the array. The use of a chopper also means that the amount of radiation received from a scene over a period of time is significantly reduced compared with that possible when an element is continuously exposed to the scene.

SUMMARY OF THE INVENTION

It is an object of the present invention to provide an improved form of thermal radiation detection apparatus of the kind recited in the opening paragraph which does not necessitate the use of a chopper, and accordingly does not suffer from the attendant disadvantages, and which is capable of eliminating substantially the kind of output signal faults which heretofore have been associated with apparatus in which received radiation is not chopped to provide an output in operation which reproduces faithfully the received radiation.

According to a first aspect of the present invention, there is provided a thermal radiation detection apparatus comprising at least one pyroelectric detector device for receiving radiation from a scene and generating a voltage signal at its output which varies in accordance therewith, the detector device output being coupled to an output of the apparatus via a signal processing circuit for processing the voltage signal generated by the detector device, characterised in that the processing circuit comprises a processing stage which is responsive to a voltage signal from the detector device to produce an output signal a first component of which is proportional to the detector device signal and a second component of which is proportional to the rate of change of the detector device signal, which components are scaled relative to one another in accordance with the value of the thermal time constant of the detector device.

According to a second aspect of the invention, a thermal radiation detection apparatus comprising at least one pyroelectric detector device for receiving radiation from a scene and generating a voltage signal at its output which varies in accordance therewith, the detector device output being coupled to an output of the apparatus via a signal processing circuit for processing the voltage signal generated by the detector device, characterised in that the processing means is arranged to respond to a detector device signal to produce a correction factor derived at least in part from a first signal which varies in accordance with the voltage signal from the detector device and to combine the correction factor with a second signal which varies in accordance with the rate of change of the device voltage signal in proportions according to the value of the thermal time constant of the detector device to produce a corrected output signal.

Such apparatus according to the invention enables high fidelity output signals to be obtained without resort to the use of a chopper, thereby avoiding the problems normally associated with chopper systems such as bulk, power requirements and loss in signal integrity. By using a processing circuit in which a signal is produced which is proportional to the rate of change of the device output signal and in which this signal is modified in a manner involving the thermal time constant an output is generated which substantially faithfully reproduces the received radiation signal in shape. The invention offers a further significant advantage in terms of performance. Theoretical considerations suggest that use of processing means of the aformentioned kind should yield a factor of two improvement in responsivity of the apparatus and factor greater than two improvement in detectivity compared with detection apparatus of the type described previously and employing a chopper. Moreover, the detection apparatus results in the reduction of noise by about a factor of 1.5. Thus the advantages of the invention are considerable.

In an embodiment of the invention according to the second aspect, the correction factor is proportional to the first signal and is added to the second signal to provide the corrected output signal.

The signal which varies in accordance with the rate of change of the detector device output signal may conveniently be derived by sampling a signal proportional to the device voltage signal at regular intervals and subtracting successive sample voltages or by means of a differentiating circuit.

The detector device preferably comprises a pyroelectric element which is connected to a source follower from which the device output signal is obtained.

In order to allow for the possibility that the detector device output signal is not at a given level, for example, zero, at the start of a detecting period, for example due to the device having previously been overloaded, and taking into account the device's electrical time constant, the processing circuit preferably is arranged to produce an output signal a third component of which is proportional to the integral with respect to time of the detector device signal, the relative proportions of the first and third components being in a ratio according to the electrical time constant of the detector device. In an embodiment of the invention according to the second aspect this may be realised by arranging that the correction factor includes an additional component which is proportional to the integral with respect to time of the first signal and in that the proportions of the correction factor and the second signal are in a ratio according to the electrical time constant of the detector device. This overcomes the problem where following an overload situation for example, the detector device signal could be swamped by a false signal resulting from the exponential decay, as determined by the electrical time constant of the device, of a large voltage at the source follower input.

The invention is particularly suitable for a thermal detector comprising a plurality of pyroelectric elements consisting of at least one linear array of elements.

BRIEF DESCRIPTION OF THE DRAWING

Thermal radiation detection apparatus in accordance with the present invention will now be described, by way of example, with reference to the accompanying drawings, in which.

DETAILED DESCRIPTION OF THE PREFERRED EMBODIMENT

Figure 1:
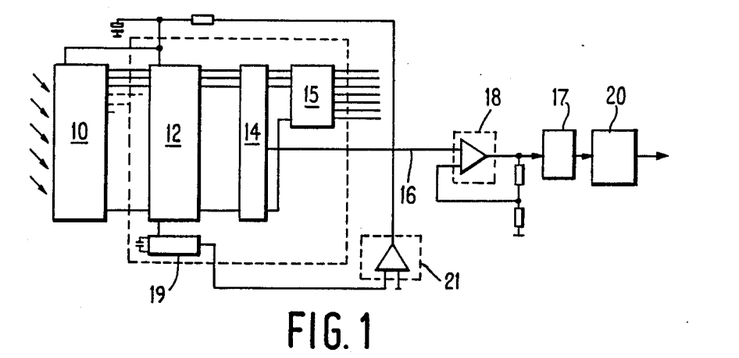
FIG. 1 is a schematic block diagram of the thermal radiation detection apparatus which includes a plurality of pyroelectric devices arranged in a linear array.

Referring to FIG. 1, the apparatus comprises a linear array of pyroelectric elements 10 which are connected to an integrated circuit 12 containing a corresponding array of impedance converting source followers for the element outputs and a multiplexer 14 under the control of an address decoder 15 for sampling the source follower outputs in turn to provide a single channel voltage signal along line 16. The signals on the line 16 may be amplified by an amplifier 18 before being supplied for subsequent filtering by a high frequency cut-off filter 17 and processing by a processing circuit generally referenced at 20. In use, the pyroelectric elements are exposed to radiation from a scene, without the use of an intervening chopper, either with the scene being moved relative to the array, for example by suitable optics or by movement of the array, or with movement within the scene and generate charges in accordance with changes in their temperature caused by changes in incident radiation levels. Apart from the processing circuit the above mentioned component parts are similar to those described in the article entitled "High Resolution 64—Element Pyroelectric Linear Array IR Detector" by Turnbull and Cooke published in Proceedings of SPIE, Vol. 807, 1987, pages 92 to 97 and reference is invited to this publication for more detailed information. Briefly, and referring now also to FIG. 2, each high impedance pyroelectric element 11 is shunted by a low leakage device 22, consisting of two diodes connected in parallel opposition which are formed in the integrated circuit 12. One terminal of the element is connected to the gate of a source follower circuit 23 from which an output is obtained. Each element 11 together with its respective low leakage device 22 and source follower constitutes an individual active detector device. One or more reference low leakage device 19 and capacitor common to all elements is also provided, one terminal of which is connected via a high gain negative feedback loop 21 to the other terminal of the reference device and also to the other terminal of the pyroelectric element via a common line. The high gain negative feedback loop operates to ensure that any d.c. offset at the one terminal of the reference device is reduced to zero, and consequently that any d.c. offset in the output voltage of the output terminal of the pyroelectric element is substantially zero. The low leakage device establishes a d.c. connection for the negative feedback loop as well as limiting the element output voltage in the event of large temperature changes.

Compensation for signals produced as a result of ramps in ambient temperature, i.e. the temperature of the apparatus, may be provided in the form of a corresponding number of supplementary pyroelectric elements (not shown for simplicity), as described in the aforementioned article by Turnbull and Cooke, each of which is connected in parallel opposition with a respective one of the elements 11 and is permanently shielded from incident radiation. Ambient temperature changes affect associated pairs of elements equally so that the effects thereof are cancelled out.

Figure 2:
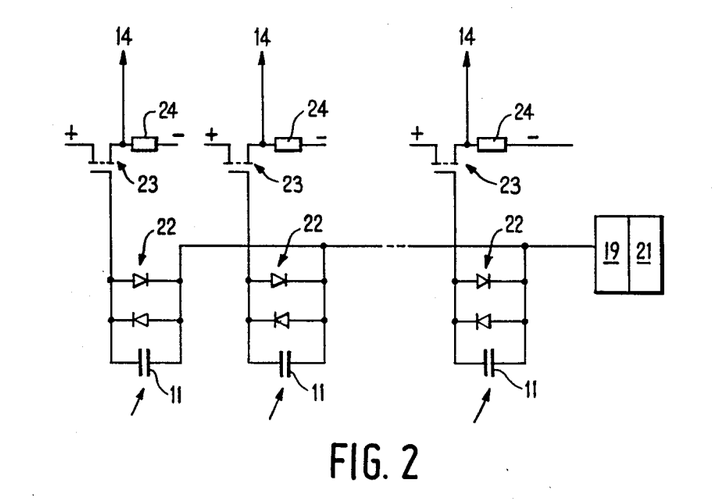
FIG. 2 shows part of the circuit configuration of a few, typical, pyroelectric devices of the array.

Each pyroelectric element 11 is associated with a MOSFET or JFET 23 source follower to provide a coupling between the very high impedance of the element and the more usual impedance levels found in electronic circuitry. Each source load, 24, comprises two much smaller depletion MOSFETs in series operating in their linear region and constituting a high resistance. The outputs from these source followers are sampled in sequence by the multiplexer 14.

The multiplexer 14 consists of series MOS switches between each source follower output and a common rail leading to line 16. In a line scanning period each source follower output from the array of elements is read in turn and the process then repeated for subsequent line scanning periods to produce a succession of device output signals which together constitute a frame in a manner which, for the case for a scene being moved relative to the array, is analogous to raster scanning so that a complete electronic picture of the scene can be built up. For a two dimensional array, arranged in rows and columns, the rows may be scanned in turn.

The pyroelectric elements 11, which may be formed in the manner described in British Patent Specification No. GB-A-2100058, consist of pyroelectric ceramic material such as barium titanate with electrodes on opposing major surfaces. Alternatively, poled PVF material may be used.

Considering now operation of the apparatus, and in particular for example the case where an image of a scene is swept, push-broom fashion, across the array 10 of pyroelectric elements, that is with the image of the scene scanned transverse to the length of the array such that individual elements view respective strips of the scene, any given element 11 of the array is then exposed to a sequence of IR radiation pulses. The voltage signal outputs produced at the source followers associated with the elements are serially supplied to the processing circuit 20 via the amplifier 18 and filter 17.

Figure 3:
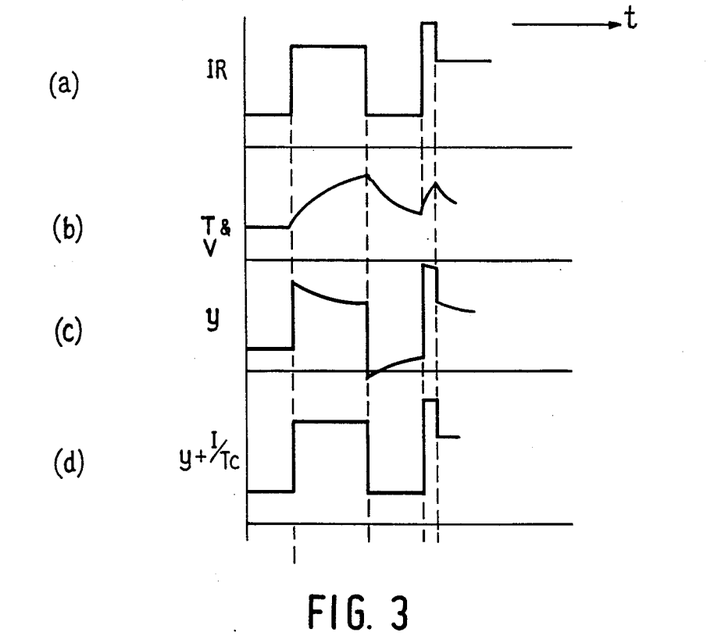
FIGS. 3(a) to 3(d) illustrate respectively by way of example a waveform of a typical sequence of IR radiation received by a representative pyroelectric element of the array, the temperature (T) of this element and the voltage signal (V) produced at the output of an associated source follower in accordance with this IR sequence, a signal waveform (y) representing the rate of change of the voltage signal V, and a corrected signal output waveform produced by the processing circuit.

For simplicity the following discussion of the operation of the processing circuit will concern itself with the signal processing effected for one typical, and representative, pyroelectric element of the array. Assuming the IR radiation signal received by this element follows the sequence depicted in FIG. 3(a), and that the detector device's electrical time constant is comparatively large, the magnitudes of the temperature excursion, T, of the element and the voltage, V, generated accordingly at the output of the associated source follower (or after amplification) with respect to time, t, are shown in FIG. 3(b), the shape of these two values substantially corresponding with one another. It is seen that the element temperature and output voltage rise and decay gradually. This is due to the thermal time constant of the element. In order to derive a signal which more closely matches in shape the received IR radiation signal, the processing circuit 20 operates, firstly, effectively to differentiate this voltage signal by, for example, sampling at regular and sufficiently small intervals of time with respect to the required resolution in the time domain and subtracting successive values. Subtracting the voltage at any given sampling from the voltage at the following sampling gives a series of voltage differences, $\Delta V$. Instead of this sample differencing technique a differentiating circuit acting on the detector device output signal can be employed. The effective differentiated voltage signal is illustrated by y in FIG. 3(c) which, as can be seen, follows more closely the IR signal. This signal y is equivalent $\Delta V/t_s$ where $t_s$ is the sampling period.

Due to the fact that the duration of some IR radiation pulses of the sequence may be of the same order as the thermal time constant of the element, usually around 0.005 to 0.5 seconds depending on the element size, its supporting substrate or substrates and other parameters, the signal derived from this simple form of differencing technique will contain faults, or anomolies, as will be apparent from FIG. 3(c). At leading and trailing edges of IR pulses, the corresponding parts of signal y are disproportionate tending to overshoot and undershoot. For periods of substantially constant levels of incident radiation, the signal y exhibits slopes.

These faults are substantially removed by further processing of the signals within the processor circuit 20. In effect, the integral, I, of signal y with respect to time, is modified according to the value of the thermal time constant, $T_c$, of the element, which has been previously measured empirically or calculated, by division to yield a correction factor $I/T_c$. This correction factor is then added to the original y signal producing a corrected output signal as depicted in FIG. 3(d). As can be seen this corrected output signal faithfully reproduces the shape of the received IR sequence signal.

The integrity of the output signal thus obtained is comparable with that provided by the previously-described known apparatus employing choppers and image difference processing techniques where the chopper ensures that the signal after image difference processing follows the IR pulses closely. Importantly, however, the apparatus according to the invention, and more particularly the application of the above-described signal correction technique, results in, firstly, the responsivity being enhanced by a factor of approximately two, secondly, the detectivity being enhanced by a factor greater than two and, thirdly, the total RMS noise being about 1.5 times smaller, whilst, of course, also eliminating the provision of a chopper.

A more detailed explanation of the operation of the apparatus will now be given, with reference to the various expressions given in FIG. 4.

Figure 4:
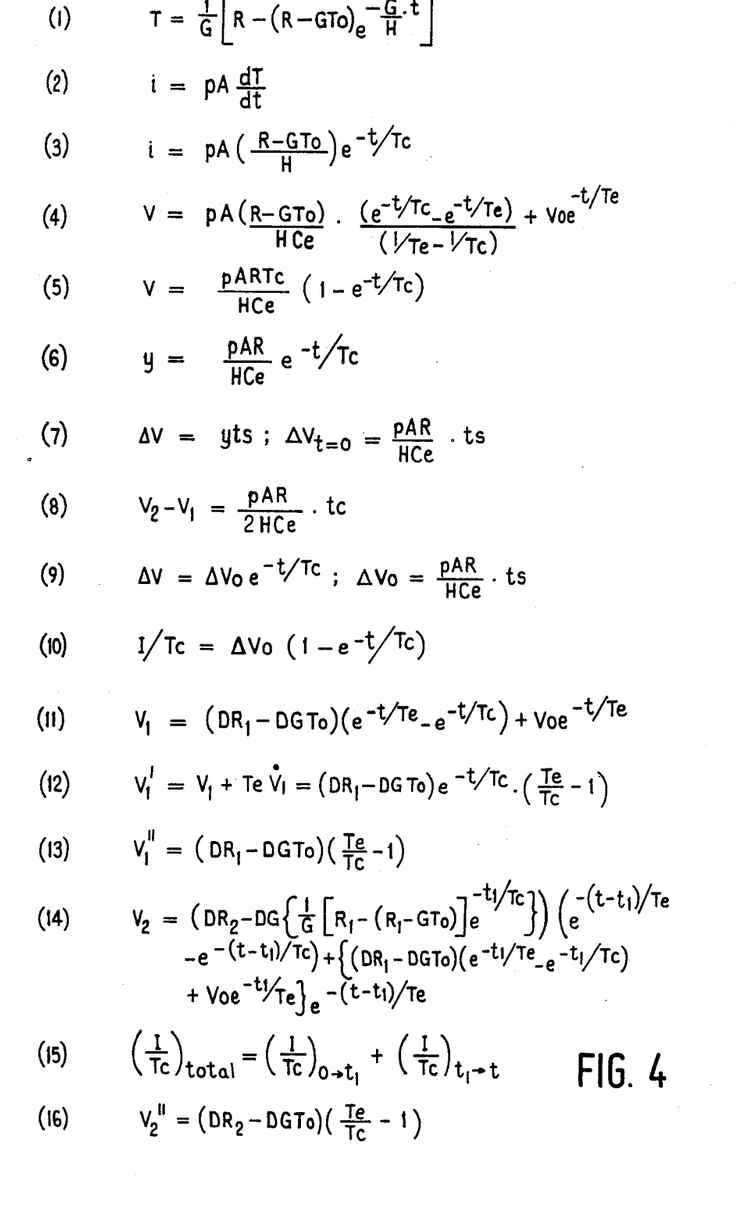
FIG. 4 is a collection of mathematical expressions which will be referred to in the following description.

The change in temperature of the pyroelectric element is given by expression (1) in FIG. 4 where T is the temperature in excess of the temperature of the sink, G is the thermal conductance to sink of the element, R is the power of the incident radiation, t is time, To is the value of T at t=0, and H is the heat capacitance of the element.

The current, i, generated by the element is given by the expression (2) where p is the pyroelectric coefficient and A is the element area.

Substituting the expression (1) for T, and since the thermal time constant Tc is equal to H divided by G, expression (2) can be written as shown at (3).

For To=0, the expression (1) simplifies and the resulting function explains the shape of the curved parts of the shape of T in FIG. 3(b).

The voltage, V, comprising the voltage at the source follower output is given by expression (4), where Te and Ce respectively are the electrical time constant of the detector device circuit up to the source follower, due to the capacitance of the element and the resistance of the device 22, and total capacitance of source follower input, and where Vo is the value of V at t=0.

For the simple case where To=0, Vo=0, and assuming Te is much larger than Tc, then this expression reduces to the form shown in expression (5). Thus the shape of V is exactly the same as the shape of T, as illustrated in FIG. 3(b).

The voltage signal V is effectively differentiated by the processing circuit 20, by sampling the voltage at intervals of time, ts, and a signal derived from the subtraction of each value of V for a given sample from the value of V for the following sample. In this way the signal comprises the sequence (V(n+1)−V(n)) where V(n+1) and V(n) are the voltages at t=t(n+1) and t=t(n) respectively and where t(n+1)−t(n)=ts. This differentiated signal, which could instead be produced by supplying the signal V to a differentiating circuit, is equivalent to the previously-mentioned signal y shown is FIG. 3(c). Thus y=dV/dt for small sampling periods. Differentiating expression (5), gives y as defined in expression (6). The shape of y would generally follow that of the IR sequence only if Tc>t as well as Te>t for all values of t during one frame scanning period. With a sequence of IR pulses as shown in FIG. 3(a) the shape of y comprises a sequence of droops according to the exponential function in expression (6) together with undershoots and overshoots at the ends and beginnings of pulses.

If y is now redefined as $\Delta V/t_s$, where $t_s$ is equal to the sampling time, then the initial values of $\Delta V$ at t=0, using expression (6), is given by expression (7).

For comparison, in an equivalent apparatus using a chopper, it can be shown that in a dynamic equilibrium situation the voltage difference $V_2-V_1$, where $V_2$ and $V_1$ are the values of V at time $t_2$ and $t_1$ respectively and the chopper is open and closed for identical periods $t_c$ corresponding to $t_2-t_1$, satisfies expression (8). Hence this voltage difference is exactly one half the value obtained without the use of a chopper (expression (7)) when ts is made equal to tc. If the voltages $V_1$ $V_2$ and $V_3$ at three successive sampling times $t_1$, $t_2$ and $t_3$ respectively are considered where $t_2 - t_1 = t_3 - t_2 = t_c$, the period for which the chopper is open or closed, and an image difference processing technique is applied, it can be shown that $(V_2 - V_1) - (V_3 - V_2)$ is equal to twice the value of $(V_2 - V_1)$ given by expression (8) for all t, whether or not dynamic equilibrium exists.

Therefore, when deriving a signal using a chopper, the signal for an effective period $t_3 - t_1 (= 2t_c)$ is twice that given by expression (8). Comparing (7) and (8), then it is apparent that (at $t = 0$) for the same effective sampling period, $t_s = 2t_c$, the signal obtained when a chopper is not used is twice the signal obtained when a chopper is used.

Referring again to expression (6), then, unless t is always very small with respect to Tc which is not likely, the signal y does not follow the IR pulse sequence. In the case of a simple step function of R, $\Delta V$ can be written as in expression (9). If $\Delta V$ is integrated with respect to time between 0 and t to give I and I is then divided by Tc, the relationship expressed at (10) is obtained.

Adding I/Tc to $\Delta V$ gives $\Delta V_c$, the corrected value of $\Delta V$, which is equal to $\Delta V_o$ (as given in expression (9)) and thus directly proportional to R.

For a series of step functions of R, it can be shown by analysis that the corrected signal $\Delta V_c$ is always directly proportional to R. Hence the faults in the original signal $\Delta V$ are corrected by adding the correction factor I/Tc to $\Delta V$ for all values of t.

With regard to noise aspects of the apparatus according to the invention, mathematical analysis, which will not be given here for simplicity, shows that for white noise the extra noise contributed by the correction factor (I/Tc) is very small. Taking into account the fractional increase in signal resulting from the addition of the correction factor, which for example in an embodiment of the apparatus having 50 pyroelectric elements each with a thermal time constant, Tc, of $5 \times 10^{-1}$ and a sampling period, ts, of $10^{-3}$ second is approximately $1.05 \times 10^{-1}$, then the signal to noise ratio is found to improve as a result of applying the correction factor.

Similarly, it can be shown that the increase in 1/f noise (where f equal frequency) due to the application of the correction factor is very small and can be disregarded.

Through comparison with noise obtained in the apparatus of the invention without a chopper and noise obtained in an equivalent apparatus using a chopper and image difference processing it is found that the RMS noise for the apparatus of the invention is approximately 1.5 times less than the value which obtains in the equivalent apparatus.

Figure 5A:
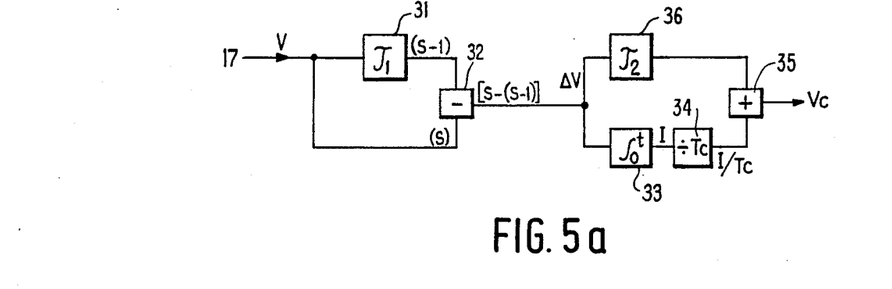
FIGS. 5a and 5b are schematic block circuit diagrams illustrating two forms of one embodiment of the processing circuit of the apparatus.
Figure 5B:
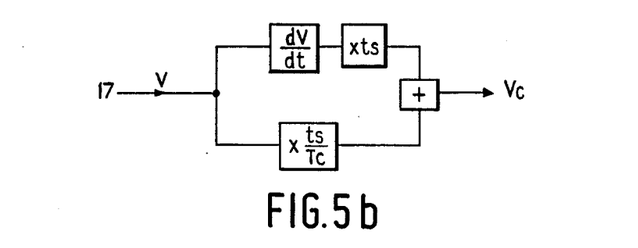

A simplified schematic diagram illustrating the operation of the processing circuit 20 at various stages thereof is shown in FIG. 5(a). The diagram is intended to show the processing operations applicable to one, representative, element of the array. It will be understood by persons skilled in the art that in practice to effect the desired signal processing for the array of elements will require facilities of storing signals for each element which appears serially along line 16. The signal, V, after amplification by amplifier 18 is supplied to one input of a subtractor 32 and also to a delay or memory 31 which effectively holds the signal for a sampling period and whose output is supplied to another input of the subtractor 32. The subtractor 32 provides an output corresponding to the difference between two successive sampled signals (e.g. S and S−1) and in effect, therefore, the output constitutes a $\Delta V$ signal (of expression (9). The $\Delta V$ signal is supplied to an integrator 33 which integrates with respect to time, t, whose output is divided by the constant Tc in a divider 34 to give the correction factor which is then passed to an adder 35 where it is added to the $\Delta V$ signal temporarily stored in a delay or memory 36 to provide a corrected signal output. The components 31 and 32 could be replaced by a differentiating circuit, providing directly the signal y. The output from the integrator 33 is equivalent to the input signal to the processing circuit 20, that is, signal V after amplification. Thus this input signal may be supplied to the divider 34 instead. Such a modified form of processing circuit is illustrated schematically in FIG. 5(b). Here, the device output signal is supplied following any amplification, to parallel branches containing respectively a differentiating circuit and a divider where it is divided according to Tc. The outputs from the two branches are then added to provide a corrected output signal.

In the preceding description of the operation of the processing circuit 20, particularly with regard to the mathematic explanation, the examples of signals considered and the operations performed on those signals have deliberately been simplified for ease of understanding. For example, it has been assumed that the initial voltage at the input of the source follower for each pyroelectric element at time $t = 0$ at the start of the frame period is sufficiently small. On this assumption, it has been shown that the processing circuit performs its desired function well. However, this condition may not always be the case during for example the time interval immediately following the application of the supply voltage to the source follower. It may also not be the case during the period following the application of a very high level of incident radiation causing overload. Should the detector device suffer overloading, then it is possible that for a period following the overload device output signal could be swamped by a false signal resulting from the exponential decay of a large voltage on the gate of the FET of the associated source follower. This decay would be governed by the electrical time constant of the detector device circuit up to the FET.

In the modified form of the processing circuit the effects of these anticipated aberrations can be substantially removed by deriving an algorithm which overcomes any swamping of small signals due to this cause. The operation of the modified processing means in this respect takes into account also the electric time constant, Te, and provides satisfactory results for substantially constant thermal and electrical time constants, Tc and Te within the range of radiation intensities expected normally to be encountered.

Referring to the expression for voltage, V, given in FIG. 4(4), the purpose of the new algorithm is to derive from the voltage V a function which is proportional to the radiation power R when R comprises a series of step functions. To this end, the differentiated signal V is multiplied by the electrical time constant, Te, and the result added to the original V signal to provide a new signal which is then processed in a manner similar to that previously described by combining with a correction factor involving the thermal time constant and the integral of this signal to produce a corrected output signal.

Considering, for example, a situation where R comprises two step functions such that at $t = 0$ to $t = t1$ the radiation level is at a substantially constant level $R_1$ and from $t=t_1$ onwards the radiation is at a substantially constant, lower, level $R_2$ and using the expression given in FIG. 4(4) then it can be shown that for the first step function, $R=R_1$ for time $t=0$ to $t_1$, the voltage, $V_1$, obtained is given by the expression (11) in FIG. 4, where D is a constant.

If this expression is now differentiated, and multiplied by Te, and then added to $V_1$ a voltage term $V^1$ is obtained as defined in expression (12) of FIG. 4. $V_1'$ can be regarded as a new signal. It does not include an exponential term dependent on Te. If the pyroelectric element should suffer an overload resulting in a large value of $V_0$, then $V_1'$ is unaffected.

If $T_0$ equals zero, or alternatively, $V_1'$ is set to zero at $t=0$, then radiation R produces a value $V_1'$ at $t=0$ which is proportional to R.

For values of t greater than zero $V_1'$ decreases due to the exponential term, so a new function of R is required to correct for the droop in $V_1'$.

A corrected signal, $V_1''$, can then be derived by integrating between 0 and t the function $V_1'$ given by expression (12), dividing this integral by $T_c$ to provide a correction factor $I/T_c$ corresponding to that used previously where I denotes the integral and then adding the correction factor to $V_1'$. The resulting corrected signal, $V_1''$, can be shown to satisfy the expression given at (13), which is independent of time.

Thus, for the step function $R_1$, the voltage $V_1''$ is also a step function, i.e. it does not decrease with time. Also, if $T_0=0$, then $V_1''$ is proportional to R1.

The algorithm is applied to subsequent step functions of R. For the next step function where $R=R_2$ for $t=t_1$ to $t_2$, new values of $T_0$ and $V_0$ must be calculated.

The new values of $V_0$ and $T_0$, here designated $V_{01}$ and $T_{01}$ are derived by substituting $t_1$ for t in expressions (11) and (2) respectively.

Using these values of $V_{01}$ and $T_{01}$ in expression (2) provides an expression for the voltage, $V_2$, during $t=t_1$ to $t_2$, as given at (14).

In similar manner to the operation performed on value $V_1$ described previously with regard to expression (12), a new function $V_2'$ is then derived by differentiating $V_2$, multiplying by Te and adding the result to $V_2$. As with $V_1'$, $V_2'$ constitutes the new signal in its uncorrected form.

As before, a correction factor can be produced by integrating this signal $V_2'$ to give I and dividing the result, I, by $T_c$. This value $I/T_c$ thus calculated constitutes the correction factor for the period $t=t_1$ to $t=t$.

The total correction factor must also include the value of $I/T_c$ for the period $t=0$ to $t_1$, which was obtained for producing the expression (13). This total correction factor is expressed at (15).

The corrected signal, $V_2''$ is then obtained by adding the total correction factor to $V_2'$, which, it can be shown, reduces to the expression given at (16).

The expression for $V''$ contains no transients. Thus, if necessary, $V''$ could be set to zero and subsequent values of $V''$ would be proportioned to the change in radiation R.

Expression (16) is similar to expression (13). Thus any sequence of step functions in R should produce values of $V''$ of magnitude corresponding to the appropriate value of R.

To summarise the operation of the processing circuit, a signal is derived from the voltage V from the source follower for an element by differentiating, the simplest way of achieving this being by sampling. Although the radiation, R, may remain constant over a period, the value of differentiated voltage descreases due to the thermal time constant. In addition, if the value of V at the start (i.e. $V_0$ at $t=0$) is not zero, due for example to a previous overloading of the element, then the effects on the voltage signal V due to the electrical time constant will yield a false signal, which can cause problems if appreciable in relation to the signal due to the radiation R. The processing circuit corrects for these problems. Firstly the differentiated signal is multiplied by the electrical time constant and the result added to the voltage V to give a new signal $V'$ which is independent of an exponential decay function dependent on the electrical time constant, Te. Secondly, this new signal $V'$ is integrated with respect to time and then divided by the thermal time constant to provide a correction factor which is subsequently added to the signal $V'$ to produce a corrected output signal, $V''$, which corrected signal is independent of any exponential functions dependent on either the thermal or the electrical time constants. If the starting value of $V''$ is zero, if necessary by re-setting, then $V''$ is proportional to R as required.

Figure 6:
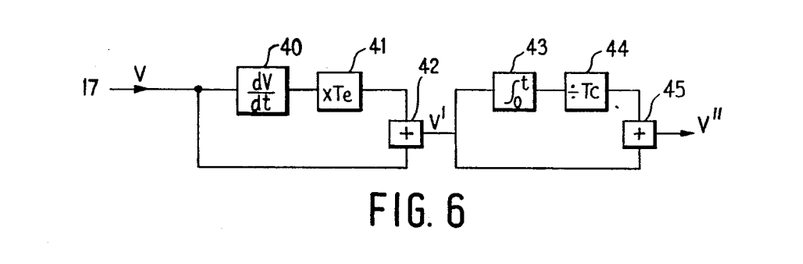
FIG. 6 is a schematic block circuit diagram of another, modified, embodiment of the processing circuit of the apparatus.

This modified form of processing circuit is represented schematically and in simplified form in FIG. 6. As before, it will be appreciated that for processing a series of signals from the array, signal storage facilities will be required. The voltage signal V from a source follower after amplification is fed to a differentiating circuit 40 whose output is multiplied by Te at 41 before being supplied to an adder 42 where the modified signal is added to the original signal V to produce the new signal $V'$. This signal $V'$ is then integrated at 43 and the integral divided by $T_c$ at 44 before being supplied to an adder 45 where it is added to the signal $V'$ to produce the corrected output signal $V''$.

Each of the outputs of the pyroelectric elements of the array are supplied in turn to the processing circuit 20 in each scanning field by operation of the multiplexer 14 so that the output from 20 consists of a series of corrected outputs for each field. These outputs may, for example, be stored for subsequent evaluation or supplied to a display device.

In an alternative arrangement, the outputs of the pyroelectric elements may be read out and processed in parallel.

The embodiments of the invention described above, by way of example, should not be taken as limiting the invention to a linear array of pyroelectric elements. The invention may also be applied to a single active element detection apparatus or to apparatus utilising a two dimensional array of elements.

From reading the present disclosure, other modifications will be apparent to persons skilled in the art. Such modifications may involve other features which are already known in the design, manufacture and use of thermal radiation detection apparatus and of thermal imaging equipments and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicity or implicity or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A thermal radiation detection apparatus comprising at least one pyroelectric detector device for receiving radiation from a scene and generating a voltage signal at its output which varies in accordance therewith, the detector device output being coupled to an output of the apparatus via a signal processing circuit for processing the voltage signal generated by the detector device, characterised in that the processing circuit comprises a processing stage which is responsive to a voltage signal from the detector device to produce an output signal a first component of which is proportional to the detector device signal and a second component of which is proportional to the rate of change of the detector device signal, which components are scaled relative to one another in accordance with the value of the thermal time constant of the detector device.

2. A thermal radiation detection apparatus according to claim 1, characterised in that the processing circuit is arranged to produce an output signal a third component of which is proportional to the integral with respect to time of the detector device signal, the relative proportions of the first and third components being in a ratio according to the electrical time constant of the detector device.

3. A thermal radiation detection apparatus comprising at least one pyroelectric detector device for receiving radiation from a scene and generating a voltage signal at its output which varies in accordance therewith, the detector device output being coupled to an output of the apparatus via a signal processing circuit for processing the voltage signal generated by the detector device, characterised in that the processing means is arranged to respond to a detector device signal to produce a correction factor derived at least in part from a first signal which varies in accordance with the voltage signal from the detector device and to combine the correction factor with a second signal which varies in accordance with the rate of change of the device voltage signal in proportions according to the value of the thermal time constant of the detector device to produce a corrected output signal.

4. A thermal radiation detection apparatus according to claim 3, characterised in that the correction factor is proportional to the first signal and is added to the second signal to provide the corrected output signal.

5. A thermal radiation detection apparatus according to claim 4, characterised in that the correction factor is obtained in the processing circuit by adjusting the level of the first signal relative to the second signal by an amount dependent on the thermal time constant.

6. A thermal radiation detection apparatus according to claim 3, characterised in that the correction factor includes an additional component which is proportional to the integral with respect to time of the first signal and in that the proportions of correction factor and the second signal are in a ratio according to the electrical time constant of the detector device.

7. A thermal radiation detection apparatus according to claim 3, characterised in that the signal which varies in accordance with the rate of change of the device voltage signal is derived in the processing circuit by sampling a signal proportional to the device voltage signal at regular intervals and subtracting successive sample voltages.

8. A thermal radiation detection apparatus according to claim 3, characterised in that the signal which varies in accordance with the rate of change of the device voltage signal is derived in the processing circuit by a differentiating circuit.

9. A thermal radiation detection apparatus according to claim 1, characterised in that the detector device comprises a pyroelectric element connected to a source follower from which the device output signal is obtained.

10. A thermal radiation detection apparatus according to claim 9, characterised in that the detector device further comprises a low leakage device which shunts the pyroelectric element.

11. A thermal radiation detection apparatus according to claim 9, characterised in that the apparatus comprises a plurality of pyroelectric detector devices whose elements are arranged in an array and whose outputs are connected to a switching circuit which operates to connect each output in turn to the processing circuit.

* * * * *